(12) United States Patent
Tardy

(10) Patent No.: US 6,598,831 B1
(45) Date of Patent: Jul. 29, 2003

(54) DEVICE SUSPENDED TO A CARRIER FOR RESCUING PEOPLE OR EQUIPMENT

(76) Inventor: Jean-Francois Tardy, 186, Boulevard de Strasbourg, F-76600 Le Havre (FR)

( * ) Notice: Subject to any disclaimer, the term of this patent is extended or adjusted under 35 U.S.C. 154(b) by 0 days.

(21) Appl. No.: 09/762,314

(22) PCT Filed: Aug. 3, 1999

(86) PCT No.: PCT/FR99/01918
§ 371 (c)(1),
(2), (4) Date: Apr. 30, 2001

(87) PCT Pub. No.: WO00/07877
PCT Pub. Date: Feb. 17, 2000

(30) Foreign Application Priority Data
Aug. 6, 1998 (FR) .............................. 98 10109

(51) Int. Cl.[7] .............................................. B64D 25/00
(52) U.S. Cl. ..................................... 244/137.2; 441/83
(58) Field of Search ....................... 244/137.2; 43/100, 43/105, 67, 12, 16; 182/137, 138, 2; 441/80, 83

(56) References Cited

U.S. PATENT DOCUMENTS

| 132,476 A | * | 10/1872 | Livaudais |
| 1,036,574 A | * | 8/1912 | Crane |
| 1,463,062 A | * | 7/1923 | Roberts |
| 2,194,621 A | * | 3/1940 | Skrjanc et al. |
| 2,652,656 A | * | 9/1953 | Glasser ........................ 43/105 |
| 3,444,569 A | | 5/1969 | Greenberg et al. |
| 3,467,346 A | | 9/1969 | Carson |
| 3,476,339 A | | 11/1969 | Gugh |
| 4,138,077 A | | 2/1979 | Okumura |

FOREIGN PATENT DOCUMENTS

FR      073892      9/1960

* cited by examiner

Primary Examiner—Galen L. Barefoot
(74) Attorney, Agent, or Firm—Birch, Stewart, Kolasch & Birch, LLP

(57) ABSTRACT

The present invention relates to a device suspended from a carrier craft for the recovery of persons or items of equipment, of the type comprising a connection (21) joining the craft to a foldable and deployable pod (20) formed by a framework associated with a flexible support (23).

The framework includes, fixed to the connection (21), a central mast (2, 3) connected to mobile means (4, 6) bearing the flexible support (23), to ensure the folding and deployment of the mobile means and of the flexible support around the central mast.

Application to the rescue of persons in danger from a helicopter.

12 Claims, 7 Drawing Sheets

DEVICE SUSPENDED TO A CARRIER FOR RESCUING PEOPLE OR EQUIPMENT

This application is the national phase under 35 U.S.C. §371 of PCT International Application No. PCT/FR99/01918 which has an International filing date of Aug. 3, 1999, which designated the United States of America.

The technical field of the present invention is that of devices suspended from a carrier craft for loading objects or for embarking persons, of the pod, or basket, type, capable of deploying from a helicopter, more especially applied to the recovery of persons in danger.

When operations are carried out to free hostages or to extricate the nationals of a country from a dangerous situation, the operational involvement of a unit is subordinated to its ability to recover the equipment it uses in the operation and the civilians or military personnel, who are the subject of the intervention, whether trapped by a situation, or liable to be so shortly.

This terminal recovery stage, which is undertaken as a matter of urgency, implies a notion of speed dictated by the imminence of a direct threat to the lives of persons who are the subject or the instigators of the intervention.

Such a recovery operation can apply to civilians or military personnel, injured or otherwise, with or without equipment to be taken with them.

In this field, several designs have already been proposed.

As the recovery of persons located in areas termed 'at risk' necessitating the use of helicopters involves either the touchdown of the aircraft or the use of a winch or of the so-called "cluster" system.

It is sometimes impossible for the craft to touch down owing to the uneven configuration of the terrain (rocky, presence of obstacles on its surface, etc.) or to the nature of the environment (wooded, marine, etc.).

The use of a winch is restricted by its small carrying capacity and the time it takes to be implemented.

The so-called "cluster" system applies solely to persons equipped with a securing harness. It too takes considerable time to implement and does not permit the transport of seriously wounded persons or those having equipment.

There is also known, from document U.S. Pat. No. 4,138,077, a folding and unfolding device suspended from a helicopter to save persons or equipment. This device is transported by helicopter to the site of the rescue in folded condition. A motorised system is then used to unfold it.

In the same technical field, there is also known patent FR 2.399.855, which discloses a rescue net in the form of a cage or car, capable of being fixed to the load hook of a helicopter or to the helicopter itself.

This rescue net is composed, in particular, of a base frame and of an upper frame, each having the shape of a square, comprising, inside the frames and laterally therebetween, flat, flexible tension straps of nylon or polyester, to constitute a structure in form of a car of upwardly decreasing size. In its deployed condition, each of the four sides of this car has an access opening, provided in the lateral straps, which can be closed by one of the closing flaps for safety reasons. The base frame, which is larger than the upper frame, is composed of two halves capable of pivoting towards one another in order to accommodate between them the upper frame and the lateral straps, to fold the rescue net as a whole after the fashion of a valise. This rescue net, which is transported folded on board a helicopter in a rectangular shape comparable with that of a package, deploys of its own accord when it is suspended from the carrying hook and released outside the helicopter.

This rescue net has a number of drawbacks, associated, in particular with its closed car shape when in deployed condition.

As a result of this shape, access is gained solely through the four lateral openings, after unfastening the flaps that close these openings. The speed of intervention is thus reduced owing to the time taken to unfasten and re-fasten all these flaps.

One major drawback of this rescue net is related to the difficulties of access, the latter being conditioned by the size of the lateral openings, as well as to the limited stowing capacity, given the restricted surface area of the base frame.

When folded, it also has the drawback of remaining relatively bulky.

A further drawback is that it is impossible to control the moment of its deployment after it has left the helicopter, which is particularly disadvantageous owing to the possible wind resistance of the deployed net, during operations taking place under adverse weather conditions.

The object of the present invention is to overcome the above drawbacks by providing a device for recovering equipment and/or persons from a carrier craft, in particular a helicopter, that is very easy and swift to implement.

The present invention also aims to provide a device permitting simple, swift access for able-bodied or injured persons, including their intervention equipment (weapons, for example) or emergency equipment (medical equipment), this being possible whatever their dimensions.

A further object of the invention is to design a device of minimum overall dimensions when in folded condition, to facilitate its transport on board a helicopter.

Another object is to permit also the triggering of the deployment or opening of a part of the device, at the moment intended.

For this purpose, the invention provides a device suspended from a carrier craft for the recovery of persons or items of equipment, of the type comprising a connection joining the craft to a foldable and deployable pod formed by a framework associated with a flexible support. The framework includes, fixed to the connection, a central mast connected to mobile means bearing the flexible support.

The central mast includes two telescopic members, one being fixed and secured by one of its ends to the connection, and the other, connected to the mobile means, being constituted by a tube sliding longitudinally about the fixed member, to ensure the folding and deployment of the mobile means and of the flexible support about the central mast.

The mobile means include, preferably, arms and stays, mutually articulated by one of their ends, with their other ends also being articulated, respectively, with the lower part and the upper part of the tube.

Each stay can be composed of two halves which can pivot towards one another in the direction of the central mast.

Preferably, the flexible support of the deployed pod is composed of at least three triangular members that are juxtaposed and rendered integral with at least three arms, with pod as a whole, folded and deployed, taking, respectively, the shape of an inverted umbrella, closed and opened.

It can comprise a bell member, constituted by a piece in the form of an inverted U rendered integral, in its centre, with the upper end of the fixed member of the mast, to hold the upper ends of the mobile means of the framework in place when the pod is folded.

It can also comprise means for locking and unlocking the upper end of the tube with the bell member, composed of at least a lock co-operating with a fastening end piece, fixed to the upper end of the tube and to the lower part of the bell member, respectively, with each lock comprising a spring associated with a ball housed in a groove in the fastening end piece to lock the pod.

The connection between craft and the pod can be constituted by an eye bolt fixed to the upper end of the fixed member of the mast.

According to one preferred form of embodiment, unlocking is triggered automatically from the helicopter by blocking the descent of a cable fastened to the eye bolt.

The pod can comprise a conical shaped steadying net disposed between the lower part of the bell member and the upper part of each stay.

Each triangular member, constituting the flexible support, can be constituted by a narrow-mesh net of synthetic material formed of flat, flexible straps sewn together.

This device has the advantage of permitting very swift recovery of civilians or military personnel, whether injured or otherwise, having equipment with them or not, and whose lives are directly threatened, or liable to be so imminently.

Another advantage resides in the original open inverted umbrella shape of the deployed pod, permitting unlimited access all around the pod, which makes for very considerable time saving during the intervention.

In folded configuration, the device also has the advantage of being very easy to stow on board an aircraft as it takes up very little room, thus not affecting the flying performance of the craft up to the recovery site.

After being dropped from the aircraft, this device advantageously affords very little wind resistance, when in folded position.

There is also a further advantage in the total control over the time of opening of the pod in relation to the conditions of the intervention.

Further characteristics and advantages of the invention will emerge from the non-limitative, detailed description given below.

This description will be given with reference to the annexed drawings, wherein.

With reference to FIGS. 1 to 7, there is shown a device for recovering persons or items of equipment designed to be suspended from a carrier craft of the helicopter type (not shown).

This device is composed of a pod 20, formed of a metallic framework associated with a flexible support 23, and of a eye bolt 21, fixed to the upper end of the framework and connected to the helicopter by its cable or by any other means.

The framework of the pod comprises a telescopic central mast constituted by a fixed cylinder 3, the upper end of which is welded to eye bolt 21, and by a tube 3 sliding longitudinally about cylinder 3.

Figure 6:
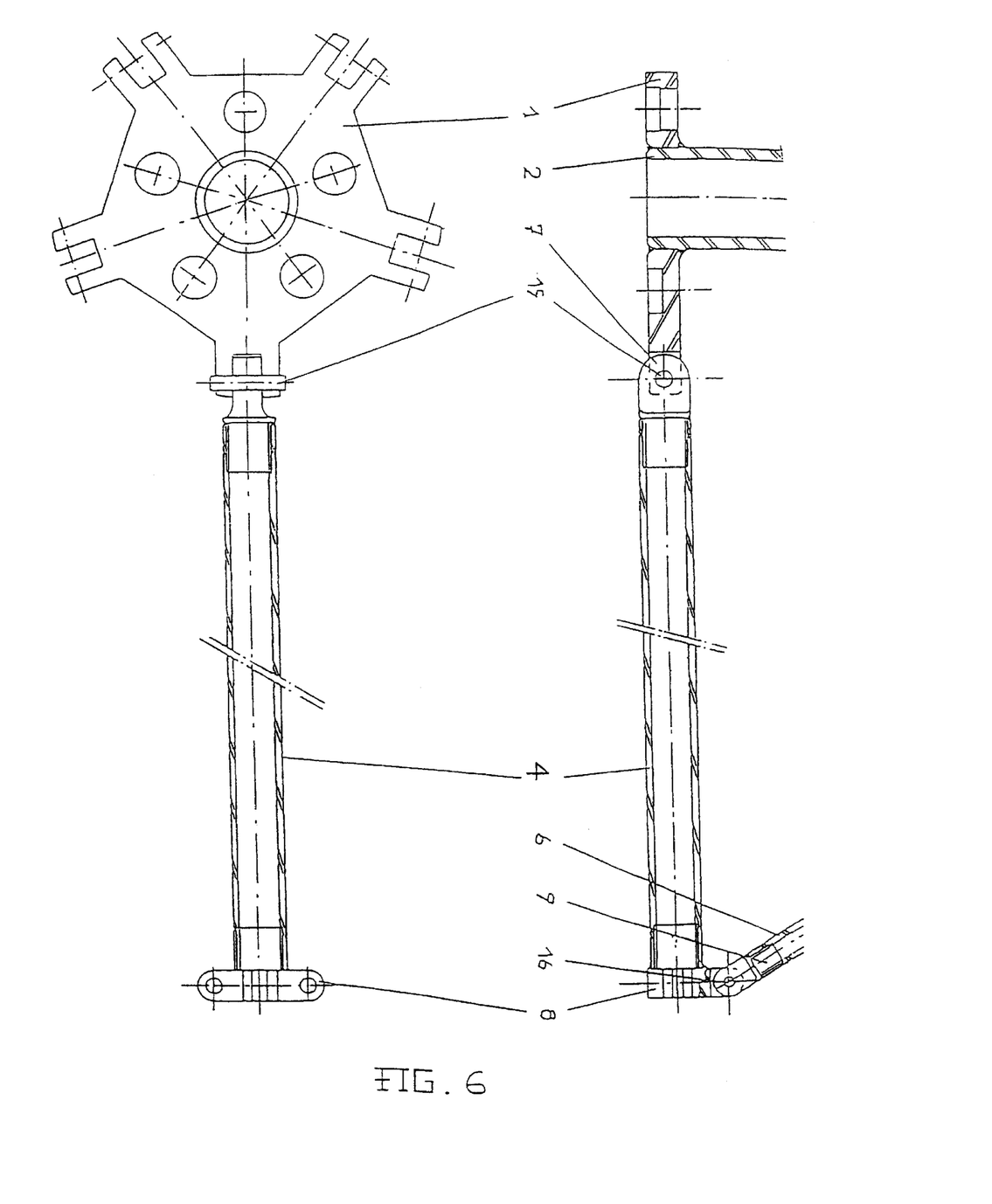
FIGS. 6 and 7 are cross-sectional views of the mobile means of the framework of the pod.

On tube 2 are articulated mobile means constituted by five identical arms 4 formed of a metallic tube and five stays 6. One of the ends of each arm 4 comprises a yoke 7 provided with a pin 15 connected to a base 1 fixed to the lower end of tube 2. The other end of the arm comprises an end piece 8 connected to one of the ends of stay 6 by a yoke 9 provided with a pin 16 (FIG. 6).

Figure 7:
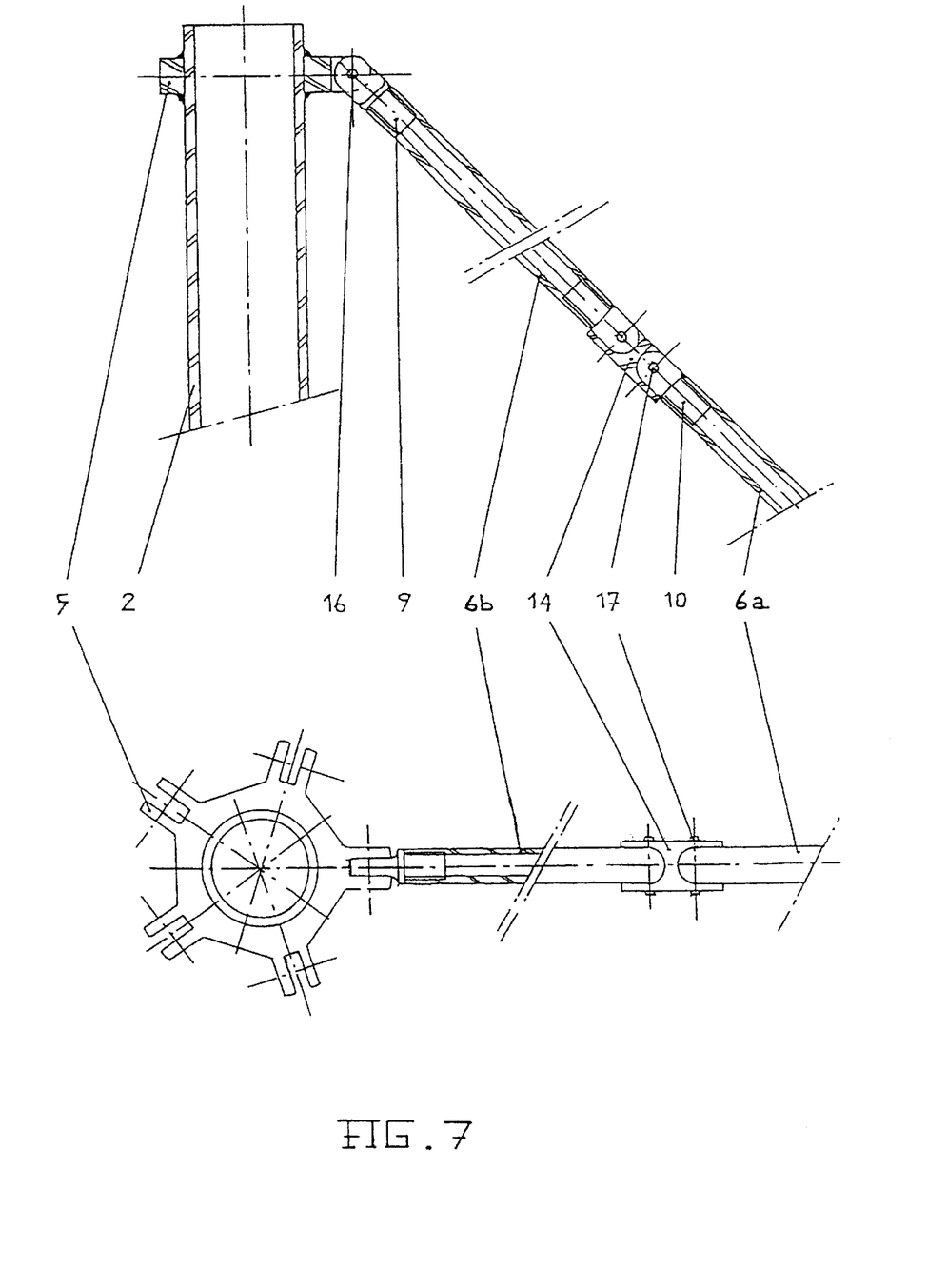

Each stay 6 is constituted by two halves, 6a and 6b, connected respectively to an arm 4 and to tube 2. These two halves are mutually articulated by means of yoke 10, fish-plate 14 and fish-plate pin 17. Upper half 6b is connected to tube 2 via a yoke 9 and a pin 16 fastened to a crown member 5 welded to the upper end of tube 2 (FIG. 7).

To the upper end of fixed member 3 of the mast is welded a bell member 12 in the shape of an inverted U (FIGS. 4 and 5) to hold the ends of the arms and of the stays in folded condition. This bell member comprises, in its central part, a fastening end piece 11 provided with a circular groove to ensure the locking of the pod by means of a lock 13 fixed to the upper end of tube 2. This lock includes three balls 26, each one associated with a spring 27, which are housed in the circular groove in fastening end piece 11.

On board the helicopter, there are provided mechanical means (not shown) of the jaw type, or any other known means, disposed about the rope or cable connecting the helicopter to eye bolt 21, to block abruptly the descent of the cable and cause a shock therein. This shock causes the automatic unlocking of each lock, followed by the opening of the pod.

These automatically unlocking mechanical means can be replaced, or supplemented, by a known manual unlocking control (not shown), constituted, for example, by a cable or any other means connecting the lock 13 to an operator on board the helicopter.

The central mast also includes, disposed between fixed member 3 and tube 2, two guide rings 18 and 19 made of a Teflon type material, and a spring 22 to absorb the shock at the end of travel of the tube over the fixed member when the pod is deployed.

Figure 3:
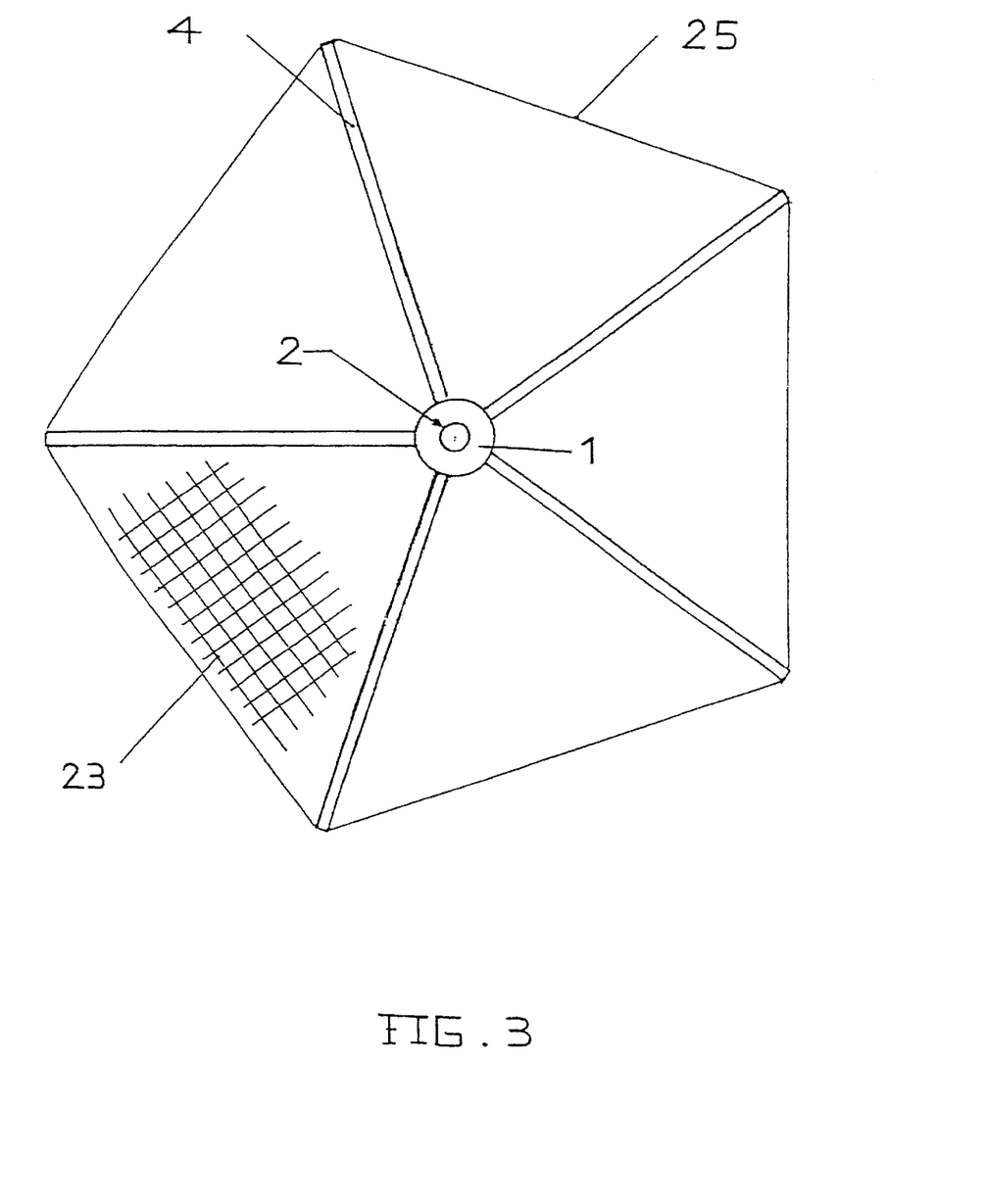
FIG. 3 is a plan view of the flexible support of the pod deployed.

The base of the pod is constituted by the flexible support 23, connected by any known means to the five arms 4 (FIG. 3).

The flexible support 23 is a net composed of five triangular elements juxtaposed to form a pentagon shaped support when the pod is deployed.

Each triangular element is made from flexible straps of synthetic material 25 mm wide, sewn together so as to obtain a 50 mm square meshes perpendicular to the outside edges of the net.

Six straps of the same type as the straps of the net, disposed at equal distances and offset by the width of a strap from one side to the other, will be sewn perpendicularly to the sides of the net to permit holding on the 35 mm diameter tubular framework.

A reinforcement 25, made of a 5 mm diameter rustproof cable with a black plastic sheath connects the external base of each element of the net to the ends of the five arms via a crimped end piece.

Figure 2:
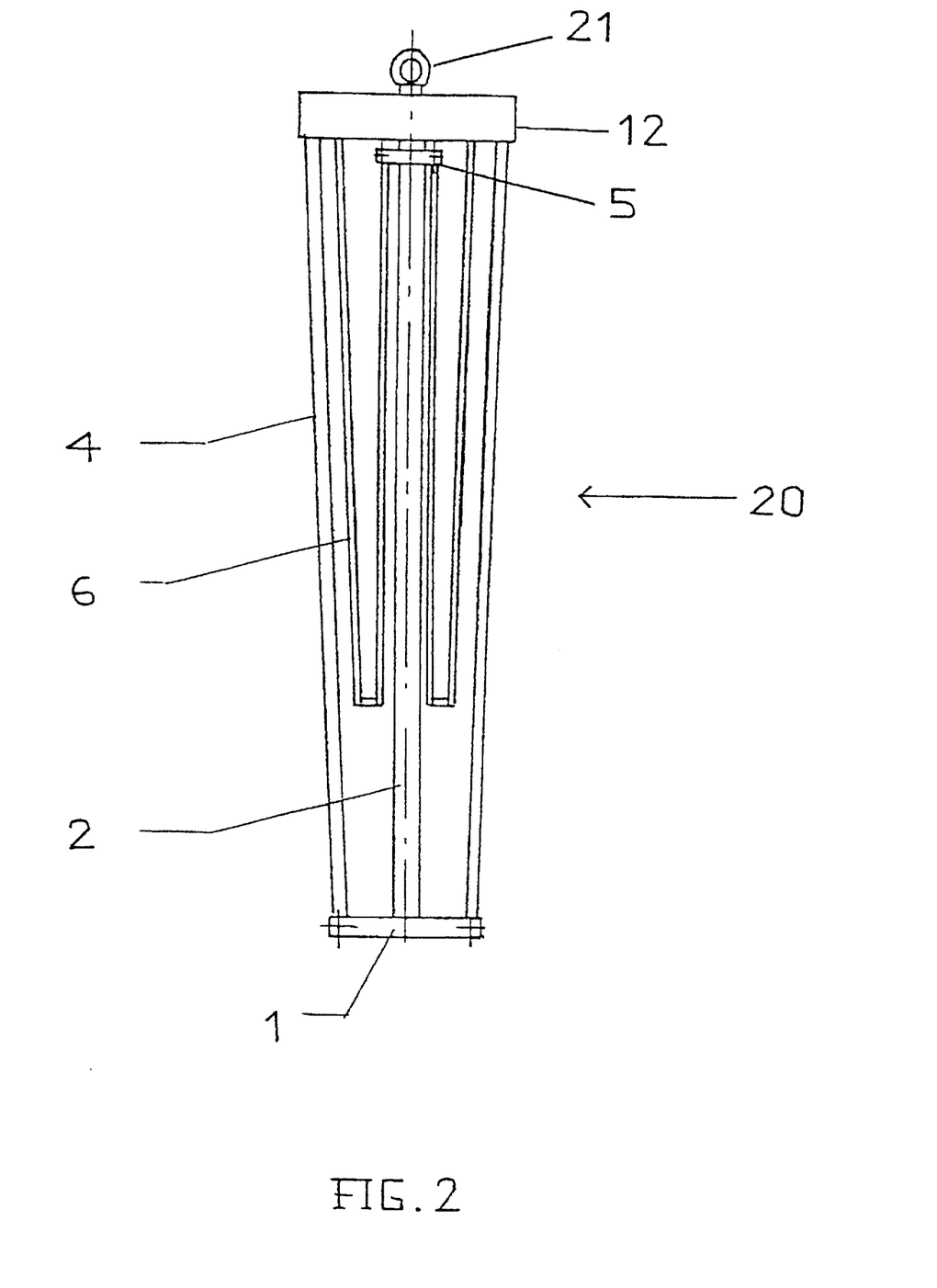
FIG. 2 shows the device of FIG. 1 with the pod folded.

The principle of this pod is akin to that of the opening and closing of an umbrella (FIGS. 2 and 3).

The pod also comprises a steadying net 24 of a conical shape (FIG. 1), connected to the lower part of bell member 12 and to the upper parts of the five stays 6, to make it possible, in particular, for the persons to be recovered to get a better grip.

Figure 1:
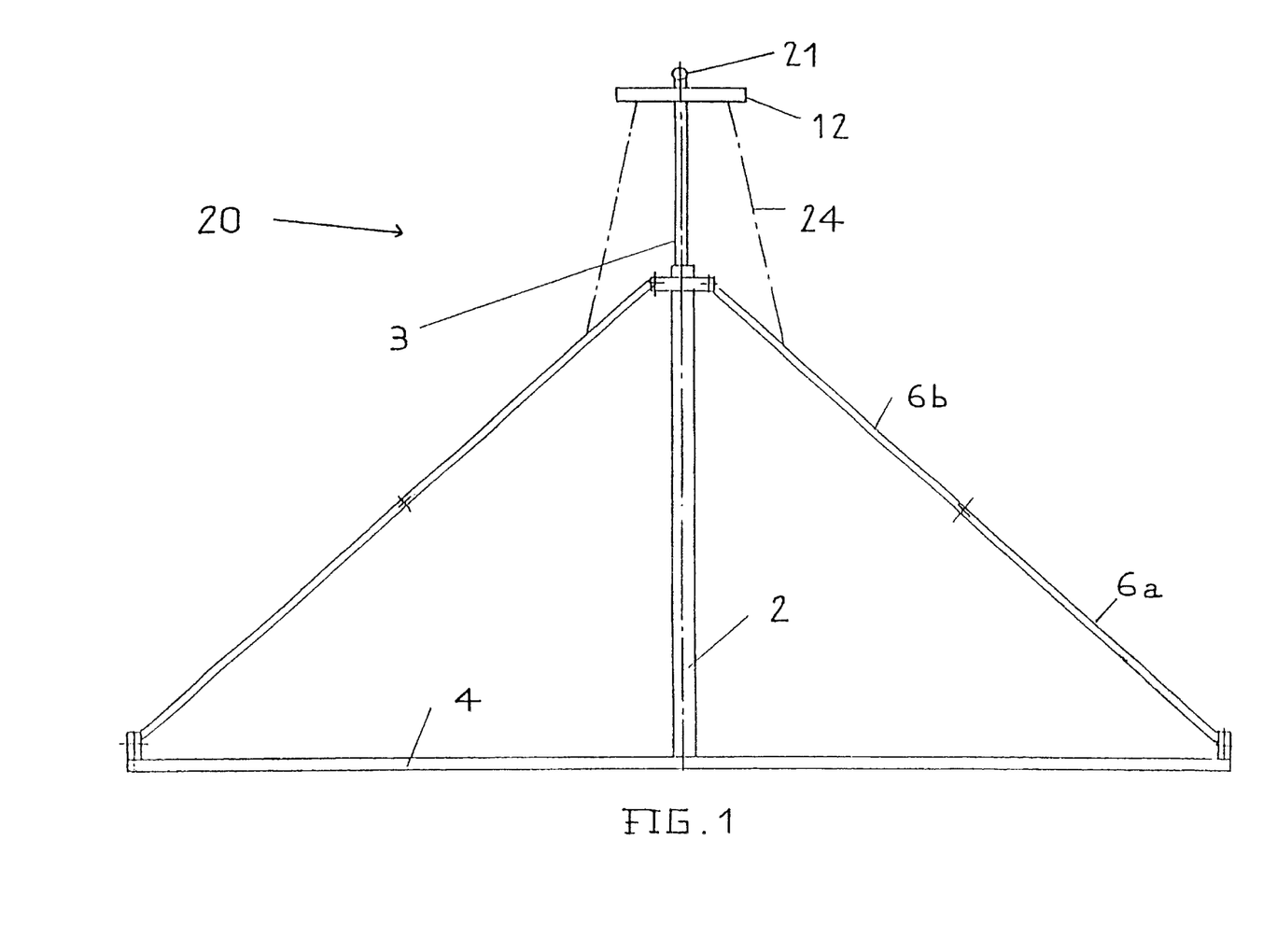
FIG. 1 schematically represents a cross-sectional profile view of the recovery device according to the invention, with the pod in deployed configuration.

This steadying netting 24 can be made of the same material as flexible support 23.

The above description illustrates an exemplary embodiment with mobile means comprising five arms 4 and five stays 6. Thus configured, this device makes it possible to transport a load of 1250 kg uniformly distributed over the flexible support. In folded position (FIG. 2), this pod has a diameter of 0.40 m and a height of 1.60 m.

A lighter device having an identical structure can be produced using mobile means having three arms and three stays.

The recovery device functions as follows.

In the recovery stage, the device, in the pod folded configuration, is connected by a smooth line to the point of anchoring of the rotary shaft located inside the helicopter. The device is then dropped via the central trap. This smooth line will uncoil, passing through the inside of a chute, provided between the point of anchoring of the rotary shaft and the trap, and which, when actuated manually, permits controlled descent of the device and its blocking, which then determines the opening of pod 20, through the shock caused in the cable.

Thus, after a free fall, and at the chosen moment, the braking of the cable, obtained by means of the chute, causes the shock that will allow the pod to open.

Under the impact of the shock, the three balls 26 exit the groove of fastening end piece 11 and free bell member 12 and fixed member 3 of the central mast.

Figure 5:
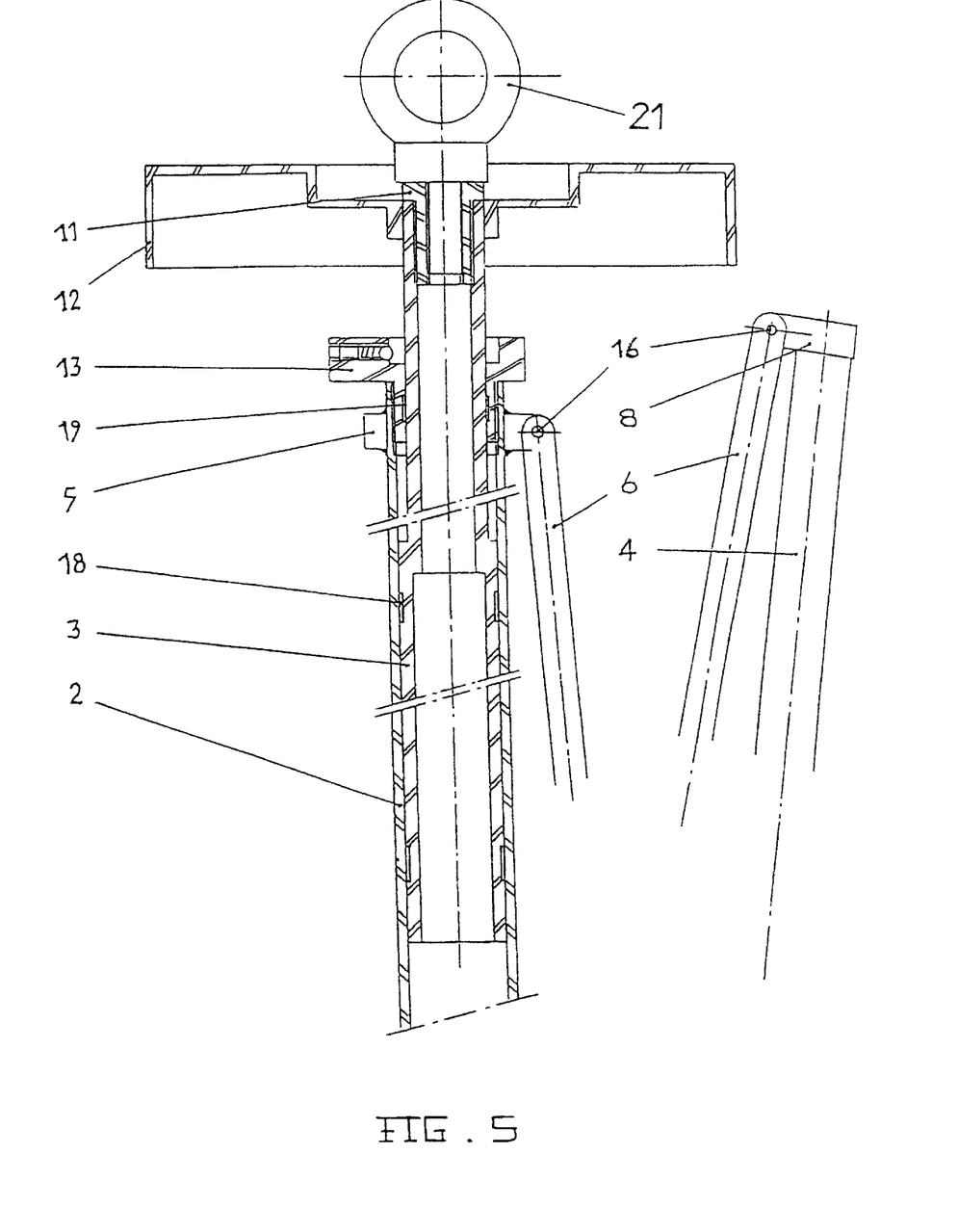
FIG. 5 is a view as in FIG. 4, with the unlocked pod in the process of being deployed.

Tube 2 and arms 4, as a result of their weight, slide downwards (FIG. 5). The ends of arms 4 and of stays 6 come out from under bell member 12.

The arms and the stays, by unfolding, cause flexible support 23 to deploy until it assumes the shape of an open inverted umbrella, then permitting swift access to the persons and items of equipment to be recovered.

In its longitudinal displacement about fixed member 3, the tube is guided by Teflon rings 18 and 19.

Figure 4:
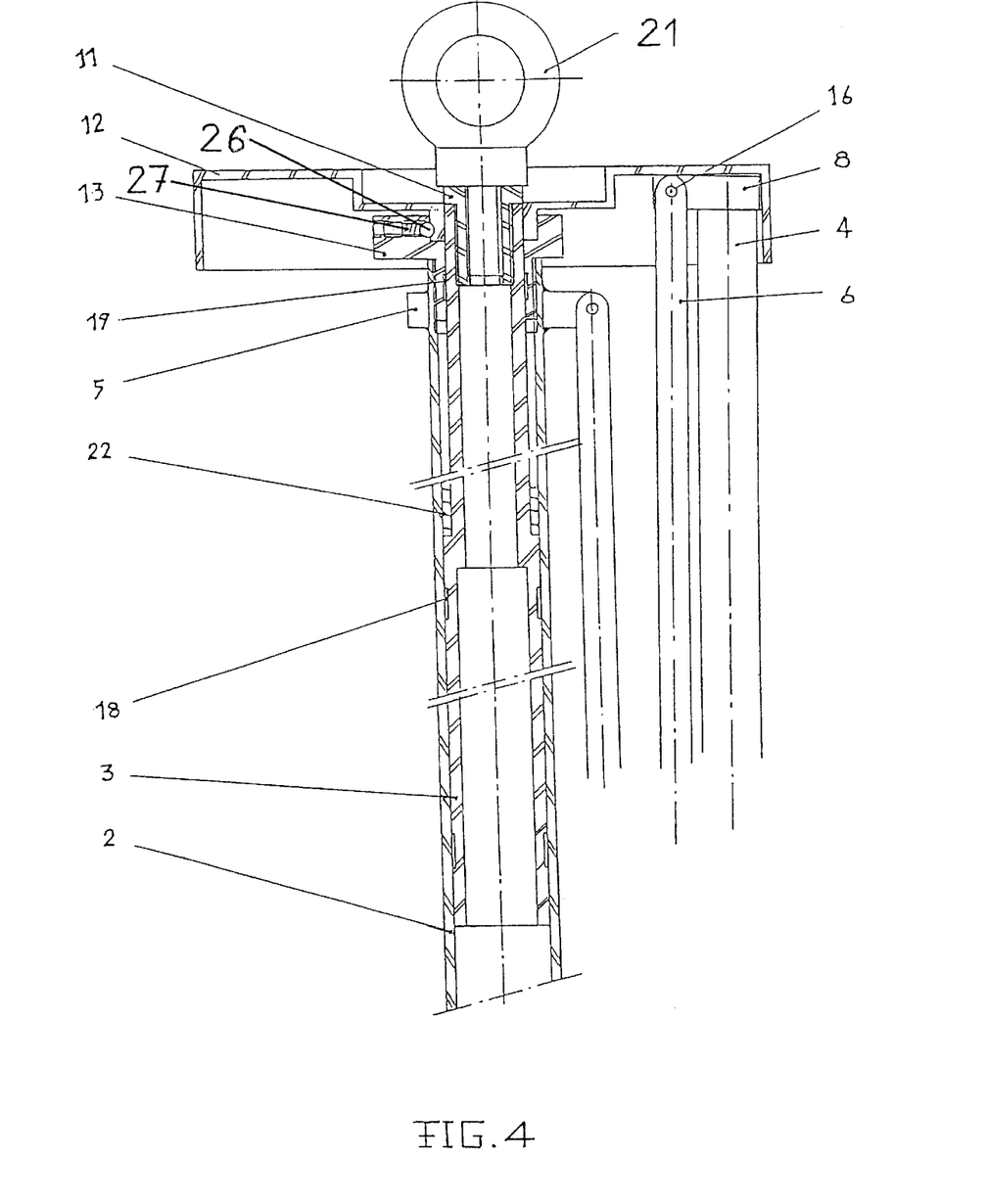
FIG. 4 is a partial, longitudinal cross-sectional view of the recovery device showing the pod folded and locked.

The end of travel shock is absorbed by spring 22 (FIG. 4).

The pod is folded manually by performing the reverse operation, comparable with the closing of an umbrella.

Various modifications could, of course, be made by a person skilled in the art to the recovery device that has just been described, solely by way of a non-limitative example, without departing from the scope of protection defined by the annexed claims.

What is claimed is:

1. A device suspended from a carrier craft for the recovery of persons or items of equipment comprising a connection joining the craft to a foldable and deployable pod formed by a framework associated with a flexible support, wherein the framework includes, fixed to the connection, a central mast connected to mobile means bearing the flexible support to ensure the folding and deployment of the mobile means and the flexible support around the central mast, wherein the central mast includes two telescopic members, one being fixed, and secured by one of its ends to the connection, and the other, connected to the mobile means, being constituted by a tube sliding longitudinally about the fixed member to ensure the folding and deployment of the mobile means bearing the flexible support about the central mast.

2. The device according to claim 1, wherein the mobile means include arms and stays mutually articulated by one of their ends, with their other ends also being articulated, respectively, with the lower part and the upper part of the tube.

3. The device according to claim 2, wherein each stay is composed of two halves which can pivot towards one another in the direction of the central mast.

4. The device according to claim 3, wherein the flexible support of the deployed pod is composed of at least three triangular members that are juxtaposed and rendered integral with at least three arms, with the pod as a whole, folded and deployed, taking, respectively, the shape of an inverted umbrella, closed and opened.

5. The device according to claim 1, comprising a bell member, constituted by a piece in the form of an inverted U, rendered integral in its center with the upper end of the fixed member of the mast, to hold the upper ends of the mobile means of the framework in place, when the pod is folded.

6. The device according to claim 5, wherein the pod also comprises means for locking and unlocking the upper end of the tube in relation to the bell member.

7. The device according to claim 6, wherein the locking and unlocking means are composed of at least a lock co-operating with a fastening end piece fixed to the upper end of the tube and to the lower part of the bell member, respectively.

8. The device according to claim 7, wherein each lock comprises a spring associated with a ball housed in a groove in the fastening end piece to lock the pod.

9. The device according to claim 1 wherein the connection between craft and the pod is constituted by an eye bolt fixed to the upper end of the fixed member of the mast.

10. The device suspended from a helicopter according to claim 9, wherein the unlocking is triggered automatically from the helicopter by blocking the descent of a cable fastened to the eye bolt.

11. The device according to claim 10, wherein the pod comprises a conical shaped steadying net disposed between the lower part of the bell member and the upper part of each stay.

12. The device according to claim 4, wherein each triangular member, constituting the flexible support is constituted by a narrow-mesh net of synthetic material formed of flat, flexible straps sewn together.

* * * * *